United States Patent Office 3,165,511
Patented Jan. 12, 1965

3,165,511
PRODUCTION OF HYDROXY-ALDEHYDES
Albert Wettstein, Riehen, and Julius Schmidlin, Basel, Switzerland, assignors to Ciba Corporation, New York, N.Y., a corporation of Delaware
No Drawing. Filed Mar. 15, 1962, Ser. No. 180,029
Claims priority, application Switzerland, Mar. 30, 1961, 3,799/61
9 Claims. (Cl. 260—239.55)

A simple method of making γ-hydroxyaldehydes and δ-hydroxyaldehydes or cyclohemiacetals thereof is the reduction of the corresponding lactones. This reaction has achieved special importance in the synthesis of natural substances. Thus, for example, an important step in the industrial manufacture of the physiologically highly active mineral corticoid aldosterone is the partial hydrogenation of a γ-lactone group to the cyclohemiacetal stage.

In the reduction of lactones to the corresponding cyclohemiacetals complex metal hydrides, such as lithium aluminum hydride and lithium borohydride, have hitherto been used exclusively. In this connection it has been observed that the success of the reaction depends substantially on structural factors. Somewhat satisfactory results are obtained only in the presence of a vicinal functional group capable of forming an additional bond with the metal hydride anion. Moreover, to prevent too extensive reduction the amount of reducing agent must be carefully measured. The vicinal functional group may be, for example, a hydroxyl group, or an acyloxy or oxo group which simultaneously enters the reaction. When there is no possibility of the intramolecular formation of a bifunctional hydride complex, the reaction does not stop at the stage of the hydroxyaldehyde-cyclohemiacetal but gives rise to the corresponding diol. Thus, for example, while it is possible to convert I into II and III into IV, which latter conversion is of importance to the preparation of aldosterone, the reduction of V—which contains no vicinal functional group capable of forming the afore-mentioned intramolecular metal complex—gives rise substantially only to the 11β:18-diol VI.

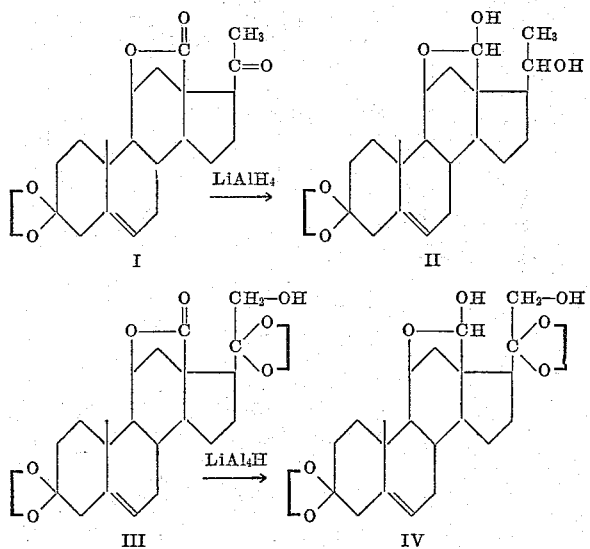

The present invention is based on the observation that, quite generally, saturated or unsaturated lactones can be partially reduced to yield the corresponding hydroxyaldehydes or cyclohemiacetals thereof, independent of the presence of sterically favourably placed substituents, by using as reducing agent an organo-aluminium hydride, preferably a dialkyl aluminium hydride. Instead of an organo-aluminium hydride there may be used a compound that gives rise to the formation of such a hydride in the course of the reaction, for example an aluminium trialkyl. The process of the present invention for the preparation of hydroxyaldehydes or their functional derivatives thus consists in reducing saturated or unsaturated lactones by the aid of organo-aluminium hydrides or of substances capable of forming such hydrides during the reaction and in solvolysing, acylating or alkylating the aluminium salts formed.

The reduction with the afore-mentioned hydrides, which is a selective one in that it leads exclusively to the hydroxyaldehyde stage, is unexpected since, for example the dialkyl aluminium hydrides have hitherto been looked upon as reducing agents equivalent to the alkali aluminium hydrides. Likewise unexpected is the fact that γ-lactones—which are directly split up into the metal salts of the corresponding diols even with sodium borohydride, that is to say with a hydride of a reducing power inferior to that of lithium aluminium hydride, with a dialkyl aluminium hydride or with an aluminium trialkyl equivalent thereto—are only reduced to the hemiacetal stage. Accordingly, the present process is a substantial improvement in the known art since it enables many reductions to be carried out that by the previously known methods could be performed at best only unsatisfactorily. Moreover, even in cases in which hitherto complex hydrides have been used and in which a partial reduction to the hydroxyaldehyde was possible the more selective effect of the afore-mentioned organo-metal hydrides leads to a distinctly better yield.

Solvents suitable for performing the reduction of the present invention are in the first place aromatic, aliphatic or araliphatic hydrocarbons, though, quite generally, any liquid may be used that is capable of dissolving the organo-metal hydride concerned but does not react with it, such as open-chain or cyclic ethers, for example diethyl ether, tetrahydrofuran or dioxane, and amines such as tripropylamine or pyridine. Depending on the nature of the agent selected, the splitting of the primarily formed organo-metal hydride adduct gives rise to the free hydroxyaldehyde or a cyclohemiacetal or functional derivatives thereof. When the splitting is performed by solvolysis e.g. with water or an alcohol or an acid, the free compound is obtained; when however there are used acylating agents there are obtained directly O-acyl derivatives of the hydroxyaldehydes or their cyclohemiacetals, and with alkylating agents e.g. alkyl halides the corresponding O-alkyl derivatives are directly formed.

As starting materials in the present process there are suitable, quite generally, saturated and unsaturated lactones, more especially 5-membered and 6-membered lactones, for example those of the aliphatic, cycloaliphatic, aromatic, araliphatic or heterocyclic series, and more especially of the steroid series. As specific starting materials of the steroid series there may be especially mentioned lactones derived from saturated or unsaturated hydroxycarboxylic acids of the pregnane and androstane series, for example the (18→11β)-lactones of 11β-hydroxy-18-acids, the (19→6β)-lactones of 6β-hydroxy-19-acids and the (19→11β)-lactones of 11β-hydroxy-19-acids and the (18→20α)- and (18→20β)-lactones of the 20-hydroxy-pregnane-18- acids; furthermore the (20→18)-lactones of saturated and unsaturated 18-hydroxyetianic acids, and the saturated or unsaturated cardanolides or bufanolides. These starting materials may otherwise be further substituted. Carbon-to-carbon double bonds, including conjugated bonds, are not affected in the course of the reduction. Any ketone and aldehyde carbonyl groups may be protected prior to the reduction by any known method, for example by acetalisation.

As examples of non-steroidal-lactones pertaining to the above mentioned classes of organic compounds there may be mentioned for instance butyrolactone, valerolactone, angelicalactone, o-hydroxymethylbenzoic acid lactone (phthalide), o-cumaric-acid-lactone (coumarin), reserpic acid lactone, deserpidic acid lactone, meconin, pilocarpin and other alkaloidal lactones.

The products of the present process are substances having valuable biological properties, or intermediates for the manufacture of such substances. The process also enables the manufacture of many new compounds. Thus, for example, the 18(11β)-cyclohemiacetal of Δ⁵-3:20 - bisethylenedioxy - 11β-hydroxy-18-oxo-pregnene—which is readily accessible from the (18→11β)-lactone of Δ⁵-3:20-bisethylenedioxy-11β-hydroxypregnene - 18-acid by the present process—is new; after splitting of the ketal groups in 3- and 20-position it can be converted by biochemical hydroxylation in 21-position e.g. by the aid of fungi of the species Wojnowicia graminis in a single operation into the genuine mineral metabolism hormone aldosterone. When the afore-mentioned lactone is subjected to the reduction according to this invention, it gives rise to a mixture of the cyclohemiacetals which are stereoisomeric at the newly formed asymmetry centre C–18 and which by virtue of their different physical properties, are easy to separate. The cyclohemiacetal-diketal, which at the carbon atom 18 corresponds configuratively to aldosterone, does not undergo rearrangement in the acid hydrolysis of the ketal groups, while by this treatment the 18-iso compound is simultaneously epimerised in position 18. This enables the two 18-epimeric cyclohemiacetal-diketals to be converted in identical manner into aldosterone. Accordingly, for the purpose referred to above there is no need to separate the mixture of epimers obtained by the reduction.

The following examples illustrate the invention and from them the possibility of applying the present process to other cases will be realised without difficulty.

*Example 1*

215.2 mg. of the (18→11β)-lactone of 3:3;20:20-bisethylenedioxy-11β-hydroxy-Δ⁵-pregnene-18-acid are covered in an atmosphere of pure nitrogen with 15 cc. of dry toluene, and in the course of 15 minutes 10 cc. of an 0.1-molar solution of diisobutyl-aluminium hydride in toluene is stirred into the suspension while carefully excluding all moisture. On completion of the dropwise solution, the resulting clear solution is stirred on for 45 minutes at 20° C., and the organo-aluminium compound is then decomposed while cooling in a mixture of ice and water by shaking for 15 minutes with 0.2 cc. of water and 0.5 gram of kieselgur, whereupon the toluene solution is dried with 2 grams of sodium sulfate and filtered through a glass sinter suction filter. The clear filtrate is evaporated under a high vacuum, the amorphous residue is taken up in tetrahydrofuran and ether, and the solution is freed from all residual toluene by being once more evaporated under reduced pressure. The crude product is crystallized from ether, to yield as the main fraction 105.2 mg. of pure 18(11β)-cyclohemiacetal of 3:3;20:20-bisethylenedioxy-11β-hydroxy-18-oxo-Δ⁵-pregnene melting at 170.0 to 172.5° C.

The residue of the mother liquor (100.9 mg.) is dissolved in 4.0 cc. of tetrahydrofuran and transferred to 40 sheets of Whatman paper No. 1 (size: 18.5 x 45 cm.; washed with chloroform and methanol). From the solvent system A according to Bush the chromatogram which at 38° C. has travelled to the bottom, the two zones of $R_f$ values 0.16–0.28 and 0.30–0.44 are separately eluted with aqueous tetrahydrofuran of 20% strength, then of 50% strength, and finally with undiluted tetrahydrofuran, and the extracts are evaporated under vacuum. The dry residue, which is distributed over a large area, is extracted with a total of 25 cc. of benzene, the extracts are collected and considerably concentrated under vacuum, filtered through 25 mg. of active carbon, and the filtrate is evaporated. The residue yields from tetrahydrofuran+ether another 16.45 mg. of the main product obtained, namely the 18(11β)-cyclohemiacetal of 3:3;20:20-bisethylenedioxy-11β - hydroxy - 18 - oxo-Δ⁵-pregnene melting at 170.0–172.5° C. In a completely analogous manner there are obtained from the residue of the upper zone by elution with benzene, decoloration of the extract on active carbon, evaporation under vacuum and recrystallization of the residue from tetrahydrofuran+ether, 24.30 mg. of the 18(11β)-cyclohemiacetal of 3:3;20:20-bisethylenedioxy-11β-hydroxy-18-oxo-Δ⁵-pregnene melting at 124.5–129.0°/154.5–162.0° C., which is 18-epimeric with regard to the above compound.

The ketal is split by covering 102 mg. of the main product, the 18(11β)-cyclohemiacetal of 3:3;20:20-bisethylenedioxy-11β-hydroxy-18-oxo - Δ⁵ - pregnene melting at 170.0–172.5° C., with 6.25 cc. of aqueous acetic acid of 67% strength and the mixture is heated under nitrogen for 15 minutes at 95–100° C. The reaction mixture is then cooled, evaporated under a high vacuum, and the residual acetic acid is completely expelled by distilling off a total of 15 cc. of toluene. The resulting crude product is dissolved in 2.5 cc. of benzene, the solution is filtered through a column of 50 mg. of active carbon, the filtrate is evaporated under vacuum, and the residue is freed from benzene by distilling off tetrahydrofuran and ether. Recrystallization of the crude product from ether yields as the main fraction 43.3 mg. of the pure 18(11β)-cyclohemiacetal of 3:18:20-trioxo-11β-hydroxy-Δ⁴-pregnene melting at 156.0–162.0° C.

The ketal splitting described above of 10.8 mg. of the 18-epimeric 18(11β)-cyclohemiacetal of 3:3;20:20-bisethylenedioxy-11β-hydroxy-18-oxo-Δ⁵-pregnene melting at 124.5–129.0°/154.5–162.0° C., obtained as by-product, with 1.0 cc. of aqueous acetic acid of 67% strength furnishes 4.80 mg. of the 18(11β)-cyclohemiacetal of 3:18:20 - trioxo-11β - hydroxy - Δ⁴ - pregnene melting at 156.0–162.0° C.

A solution of 3.45 mg. of the 18(11β)-cyclohemiacetal of 3.18:20-trioxo-11β-hydroxy-Δ⁴-pregnene in 0.25 cc. of glacial acetic acid is oxidised with 0.145 cc. of a solution (which is of 0.071 N strength with respect to oxygen) of chromium trioxide in acetic acid of 99.5% strength. The reaction is completed by adding three portions of 0.015 cc. each of the same chromium trioxide solution at intervals of 1½ hours. After a total of 6 hours the excess oxidation product is decomposed with 0.05 cc. of 0.1-molar sodium bisulfite, whereupon the reaction product is evaporated almost to dryness under vacuum, and the residue is taken up in a 1:3-mixture of methylene chloride and ether. While being cooled with ice, the solution is successively washed with 0.2 N-sulfuric acid, 0.5 N-sodium bicarbonate solution and water, dried with sodium sulfate, and evaporated. The residue crystallizes from a small amount of ether, to yield as a first fraction 2.75 mg. of the pure (18→11β)-lactone of 3:20-dioxo-11β-hydroxy-Δ⁴-pregnene-18-acid melting at 186.0–190.5° C. As revealed by semi-quantitative paper-chromatographic examination in the system formamide/cyclohexanebenzene (1:1), the mother liquor (0.68 mg.) consists predominantly of the same substance.

The starting material used in the above example can be prepared, for example, as follows:

1.933 grams of the (18→11β)-lactone of 3:20-dioxo-11β-hydroxypregnene-18-acid are dissolved in 365 cc. of an 0.002-molar solution of paratoluenesulfonic acid monohydrate in ethylene glycol by being heated at 85–90° C., whereupon in the course of 3 hours about 300 cc. of ethylene glycol are distilled off under a high vacuum. The resulting suspension is cooled and then flushed with 40 cc. of 0.2 N-sodium bicarbonate solution and 100 cc. of methylene chloride into a mixture of 20 cc. of 0.5 N-sodium bicarbonate solution, 100 grams of ice and 80 cc. of water, and immediately thereafter thoroughly agitated. The bottom layer is then separated, and the aqueous phase is further extracted with 6×50 cc. of methylene chloride. Each extract is separately washed with water and then dried with sodium sulfate. The sodium sulfate is then filtered off and the filtrate is concenerated to a residual volume of about 10 cc., whereupon the residual methylene chloride is expelled by distilling off ether which is added in portions. From a final volume of about 20 cc., there crystallize out within 1 hour, 1.900 grams of the (18→11β)-lactone of 3:3;20:20-bisethylene-dioxy-11β-hydroxy-Δ⁵-pregnene-18-acid melting at 235–240° C.

*Example 2*

A solution of 186.2 mg. of the (18→20β)-lactone of 3:3-ethylenedioxy-20β-hydroxy-Δ⁵-pregnene-18-acid in 45 cc. of anhydrous toluene is cooled to —70° C. with exclusion of moisture, whereupon within 15 minutes 5.0 cc. of an 0.5-molar solution of diisobutyl-aluminium hydride in toluene are stirred in dropwise. The reaction mixture is stirred on for 20 minutes at —70° C., the excess reducing agent is decomposed at —70° C. by slowly adding 10 cc. of a mixture of anhydrous isopropanol and toluene (which is molar with respect to isopropanol) and the whole is then shaken for 5 minutes with 0.25 cc. of water at 0° C. 0.5 gram of kieselgur is then added, the whole is dried with sodium sulfate and the inorganic matter is filtered off the toluene solution. The clear filtrate is evaporated under vacuum, the residue freed completely from toluene under a high vacuum and then recrystallized from ether with the use of tetrahydrofuran as solution promoter. Total yield: 150.0 mg. of pure 18(20β)-cyclohemiacetal of 3:3-ethylenedioxy-18-oxo-20β-hydroxy-Δ⁵-pregnene melting at 188.0 to 192.0° C.

37.45 mg. of the resulting 18(20β)-cyclohemiacetal of 3:3-ethylenedioxy-18-oxo-20β-hydroxy-Δ⁵-pregnene and 2.0 cc. of acetic acid of 67% strength are heated under nitrogen for 10 minutes at 95–100° C., allowed to cool, and then evaporated in an oil pump vacuum. The crude product is freed from residual acetic acid by vacuum distillation with the aid of a total of 10 cc. of toluene; the residue is dissolved in 2.5 cc. of tetrahydrofuran and transferred to 25 sheets of Whatman paper (size: 18.5 x 45 cm.; washed with chloroform and methanol). After chromatography at 38° C. in the solvent system A according to Bush, the zone of $R_f$ 0.12–0.30, which displays strong absorption in the ultra-violet region, is successively eluted with aqueous tetrahydrofuran of 20% and then of 50% strength and finally with undiluted tetrahydrofuran, the extracts are collected and completely evaporated under vacuum. The dry residue, which is distributed over a large area, is then extracted with a total of 25 cc. of benzene. The extracts are collected, considerably concentrated under vacuum, the solution is filtered through a column of 25 mg. of active carbon prepared with benzene, and the colourless filtrate is evaporated under vacuum. The residue is liquified with a small amount of ether, and then treated with petroleum ether, whereupon it yields 22.75 mg. of the pure 18(20β)-cyclohemiacetal of 3:18-dioxo-20β-hydroxy-Δ⁴-pregnene melting at 156.5 to 161.0° C.

The starting material used in the above example can be prepared, for example, by the process described in Belgian Patent No. 587,496 granted August 11, 1960 to Ciba Société Anonyme.

*Example 3*

A solution of 135 mg. of o-hydroxy-methyl-benzoic acid lactone in 25 cc. of anhydrous toluene is cooled down to —70° C. and there are added in the course of 30 minutes 2.5 cc. of a 1-molar solution of di-isobutyl-aluminiumhydride in toluene. The solution is then stirred for further 3½ hours at —70° C., at this temperature the excess of hydride is destroyed by adding dropwise 0.6 cc. of isopropanol in 6.9 cc. of toluene and hydrolysis is brought about at 0° C. by thoroughly agitating the mixture with 0.25 cc. of water. The suspension thus formed is mixed with 0.25 gram of diatomaceous earth, the solution is then dried with sodium sulfate (1.5 grams) and filtered. The clear solution is evaporated, the residue is dissolved in benzene and then chromatographed on 5 grams of silicagel. From the fractions eluted with benzene-ethyl acetate (1:1) and ethyl acetate there is obtained a product which upon distillation in the high vacuum gives pure hydroxy-phthalane (phthalanol) as a colourless oil.

*Example 4*

A mixture of 1.0 g. of valerolactone and 30 mg. of anhydrous toluene is cooled down to —70° C. and there are then added in the course of 30 minutes under vigorous stirring 15 cc. of a 1-molar solution of diisobutyl-aluminiumhydride in toluene. The mixture is then stirred at —70° C. for a further one and a half hours, then 5 cc. of isopropanol are added dropwise at the same temperature. There is then added for hydrolysis 1.0 cc. of water. The suspension thus formed is dried with a total of 2.5 grams of sodium sulfate, the solution is then filtered through a layer of diatomaceous earth and it is then freed from the toluene and the isopropanol in the vacuum. The oily residue is distilled with a fractionating column. The principal portion is pure hydroxy-valeraldehyde, which boils at 12 mm. at 66–68° C. The compound does not show any specific IR-absorption in the carbonyl region which means that it is present in the cyclo-semiacetal form.

What is claimed is:

1. Process for the manufacture of a member selected from the group consisting of γ-hydroxyaldehyde-cyclohemiacetals, α-hydroxyaldehyde-cyclohemiacetals, their O-acyl and O-lower alkyl derivatives, by reduction of the lactones of corresponding hydroxy-carboxylic acids, wherein reduction is carried out with a member selected from the group consisting of a di-lower alkyl aluminum hydride and an aluminum tri-lower alkyl capable of forming a di-lower alkyl aluminum hydride, and the aluminum adduct thus obtained is reacted with a member selected from the group consisting of water, an alcohol, acid, acid halide, acid anhydride and a lower alkyl halide.

2. Process according to claim 1, wherein there is used as dialkyl-aluminum hydride di-isobutyl-aluminum hydride.

3. Process according to claim 1, wherein there is used as a compound capable of forming a dialkyl-aluminum hydride during the reaction tri-isobutyl-aluminum.

4. Process according to claim 1, wherein there is used as starting materials a member selected from the group consisting of a γ- and a α-lactone of a hydroxy carboxylic acid of the aliphatic series, the aromatic series, the cycloaliphatic series and the heterocyclic series.

5. Process according to claim 1, wherein there is used as starting material a member selected from the group consisting of a γ- and a α-lactone of steroidal hydroxy carboxylic acids.

6. Process according to claim 1, wherein there is used at starting material a member selected from the group consisting of an (18→11β)-lactone of a saturated and an unsaturated 11β-hydroxy-18-acid of the pregnane androstane series.

7. Process according to claim 1, wherein there is used as starting material a member selected from the group consisting of an (18→20β)-lactone of a saturated and an unsaturated 20β-hydroxy-18-acid of the pregnene and androstane series.

8. Process according to claim 1, wherein the reduction is carried out at a temperature between about +20° C. and −70° C.

9. Process according to claim 2, wherein the reaction with di-isobutyl-aluminum hydride is carried out at a temperature between about +20° C. and −70° C.

References Cited in the file of this patent
UNITED STATES PATENTS

| | | |
|---|---|---|
| 2,982,767 | Kerwin et al. | May 2, 1961 |
| 3,014,904 | Reichstein et al. | Dec. 26, 1961 |

UNITED STATES PATENT OFFICE
CERTIFICATE OF CORRECTION

Patent No. 3,165,511     January 12, 1965

Albert Wettstein et al.

It is hereby certified that error appears in the above numbered patent requiring correction and that the said Letters Patent should read as corrected below.

Column 3, line 71, for "solution" read -- addition --; column 4, line 66, for "3.18:20-" read -- 3:18:20- --; column 7, line 9, for "at" read -- as --.

Signed and sealed this 27th day of July 1965.

(SEAL)
Attest:

ERNEST W. SWIDER
Attesting Officer

EDWARD J. BRENNER
Commissioner of Patents